United States Patent

Tseng et al.

Patent Number: 5,781,675
Date of Patent: Jul. 14, 1998

[54] METHOD FOR PREPARING FIBER-OPTIC POLARIZER

[75] Inventors: Shiao-Min Tseng; Ssu-Pin Ma; Kun-Fa Chen; Kuang-Yu Hsu, all of Hsinchu, Taiwan

[73] Assignee: National Science Council, Taipei, Taiwan

[21] Appl. No.: 818,097

[22] Filed: Mar. 14, 1997

[51] Int. Cl.$^6$ ............................................. G02B 6/26
[52] U.S. Cl. ................... 385/30; 385/147; 385/42; 385/51; 385/32; 385/48; 451/41
[58] Field of Search .................. 451/41, 42; 385/147, 385/30, 42, 51, 32, 48, 27, 50

[56] References Cited

U.S. PATENT DOCUMENTS 4,601,541  7/1986  Shaw et al. .................... 451/41

FOREIGN PATENT DOCUMENTS

| 0339918 | 11/1989 | European Pat. Off. | 385/51 |
| 1-202706 | 8/1989 | Japan | 385/51 |
| 1-2040007 | 8/1989 | Japan | 385/51 |

*Primary Examiner*—John Ngo
*Attorney, Agent, or Firm*—Fish & Richardson P.C.

[57] ABSTRACT

A method for preparing a fiber-optic polarizer involves a first step in which the cladding layer of a single-mode optical fiber is side-polished to form a planar surface contiguous to the core region of the single-mode optical fiber. The planar surface is formed thereon a buffer dielectric/metal composite thin film, or the planar surface is coated by sputtering with a metal layer which is then coated with a medium having a refractive index matching to that of the optical fiber. The polishing of the single-mode optical fiber is done by using a semiconductor substrate having one or more V-shaped recesses having a large curvature radius.

6 Claims, 7 Drawing Sheets

METHOD FOR PREPARING FIBER-OPTIC POLARIZER

FIELD OF THE INVENTION

The present invention relates generally to a fiber-optic polarizer, and more particularly to a method of the preparation of the fiber-optic polarizer.

BACKGROUND OF THE INVENTION

The fiber-optic polarizer is an indispensable component of a coherent fiber-optic communication system or fiber-optic phase sensory system. An all-fiber polarizer is superior to a conventional planar waveguide polarizer or a conventional bulk-optic polarizer in view of the fact that the all-fiber polarizer can be directly spliced in a fiber-optic system with low loss and good stability, and that the all-fiber polarizer has great potential for excellent performance, and further that the all-fiber polarizer can be made at a relatively low cost.

The conventional method for preparing the fiber-optic polarizer is illustrated in FIGS. 1–3 and is composed of a first step in which a section of the unjacketed single-mode optical fiber 10 is glued to the arcuate recess of a substrate 40. The optical cladding layer 11 of the fiber 10 is then mechanically polished to the extent that the core region 12 of the fiber 10 is close to naked. Since the core region 12 of the fiber 10 is close to naked, the evanescent field of the core region 12 is strongly exposed to the outside of the fiber 10 when a guided mode propagates through the polished region. The fiber 10 is further processed to form a fiber-optic polarizer.

A preferred method for preparing the fiber-optic polarizer involves a process in which the polished surface of the fiber 10 is coated by vacuum sputtering with a buffer dielectric material layer 20 having an appropriate thickness. The buffer dielectric material, such as magnesium fluoride, has a lower refractive index than that of fiber. The coated region of the fiber 10 is subsequently deposited with a metal (such as aluminum) material layer 50 having a thickness in excess of its skin depth, as shown in FIG. 2.

An alternative method involves the formation of a metal material layer 50 which is thinner than its skin depth on the polished surface and then is coated with a dielectric film 30 having an appropriate refractive index, as shown in FIG. 3. The dielectric film 30 may be replaced with a liquid or dielectric having a refractive index which is close to the refractive index of the optical fiber.

The basic working principle of the fiber-optic polarizer is expounded explicitly hereinafter in conjunction with FIGS. 2 and 3.

The metal/buffer dielectric interface supports surface plasmon wave, of which the polarized direction of magnetic field is parallel to the polished surface of the single-mode optical fiber 10. As a result, the surface plasmon wave can only be excited by a TM-polarized light. As the TM mode is transmitted through the metal/dielectric interface, its power is attenuated. On the other hand, the surface plasmon wave can not be excited by a TE mode which has an electric field polarization parallel to the polished surface of the single-mode optical fiber. As a result, the degree of attenuation of a TE mode is far lower than the TM mode.

In order to increase the polarization extinction ratios between the TM and the TE mode, the following designing requirements of the fiber-optic polarizer must be met.

The arcuate recess of the substrate for polishing the optical fiber must have a large curvature radius because the effective interaction length of the polished fiber is proportional to the square root of the curvature radius of the arcuate recess.

The scattering loss of the polished fiber must be minimized.

The effective refractive index in view of the surface plasmon wave should be close to the effective refractive index seen by the guided mode, so as to enable the TM polarized light to effectively excite the surface plasmon wave when the TM polarized light is transmitted through the polished region. As a result, the light intensity is greatly attenuated. The magnitude of the effective refractive index in view of the surface plasmon wave of the structure shown in FIG. 2 is dependent on the refractive index of each medium and the thickness of the metal material and the thickness of the buffer dielectric material. The magnitude of the effective refractive index of the surface plasmon wave of the structure shown in FIG. 3 is dependent on the refractive index of the thin metal layer, the deposition thickness, and the magnitude of the refractive index of the outermost deposited material or sputtered dielectric material.

In the preparation for the fiber-optic polarizer of the prior art, a glass or quartz material is generally used as a substrate for polishing the fiber. The mechanically-formed arcuate recess of the polishing substrate has a typical curvature radius of about 25 centimeters. The effective interaction length of the polarizer is in the neighborhood of 1.5 millimeters. It is technically difficult to make mechanically the arcuate recess on the glass or quartz substrate such that the arcuate recess has a curvature radius longer than 25 centimeters. In addition, the insertion loss of the polished fibers is relatively high when the substrate having mechanically-formed arcuate recess is used to hold the optical fiber during polishing.

SUMMARY OF THE INVENTION

The present invention is characterized in design in that it makes use of a semiconductor substrate, such as a silicon wafer, as the polishing substrate of the single-mode optical fiber. The semiconductor substrate is provided with one or more V-shaped recesses, which are parallel to one another and formed micro-electronically with long curvature radii. The technical shortcomings of the prior art are therefore averted.

According to the present invention, the method for preparing a fiber-optic polarizer is composed of the following steps:

(a) forming one or more parallel arcuate recesses on a polishing substrate;

(b) gluing one single-mode optical fiber in each of the arcuate recesses such that a section of the cladding layer is exposed to the outside of the arcuate recess;

(c) polishing the exposed section of the cladding layer to form a polished planar surface contiguous to the core region;

(d) forming on the polished planar surface a buffer dielectric film of an appropriate thickness and then forming on the buffer dielectric film a metal layer having a thickness in excess of its skin depth; or forming on the polished planar surface a thin metal layer having a thickness thinner than its skin depth and then optionally forming by vacuum sputtering on the thin metal layer a thin dielectric film capable of protecting the thin metal layer from the atmospheric oxidation, and finally forming thereon a buffer dielectric material having a refractive index which matches the single-mode optical fiber.

Said polishing substrate is a semiconductor substrate have a planar face. Said one or a plurality of arcuate recesses are formed by forming an etching mask having one or a plurality of slits on said planar face, anisotropically chemically etching the masked planar face of said semiconductor substrate, and stripping said etching mask off from said semiconductor substrate. Then one or a plurality of V-shaped recesses parallel to one another and having a curvature radius ranging between 200 centimeters and 2000 centimeters are formed.

Said etching mask is, for example, an etching mask of silicon dioxide ($SiO_2$). The materials that are suitable for use as the buffer dielectric of the present invention include $MgF_2$, $CaF_2$, $BaF_2$, LiF, and polymer materials. The metal layer formed on the buffer dielectric film may be aluminum, nickel, silver, indium, and gold. The one or a plurality of slits of the etching mask of the present invention is preferably attained by photolithography. It is suggested that the one or a plurality of slits have a width which is progressively greater towards both ends of the slit from the center of the slit.

The objectives and the features of the present invention will be more readily understood upon a thoughtful deliberation of the following detailed description of the embodiments of the present invention in conjunction with the accompanying drawings.

DETAILED DESCRIPTION OF THE INVENTION

Figure 4A:
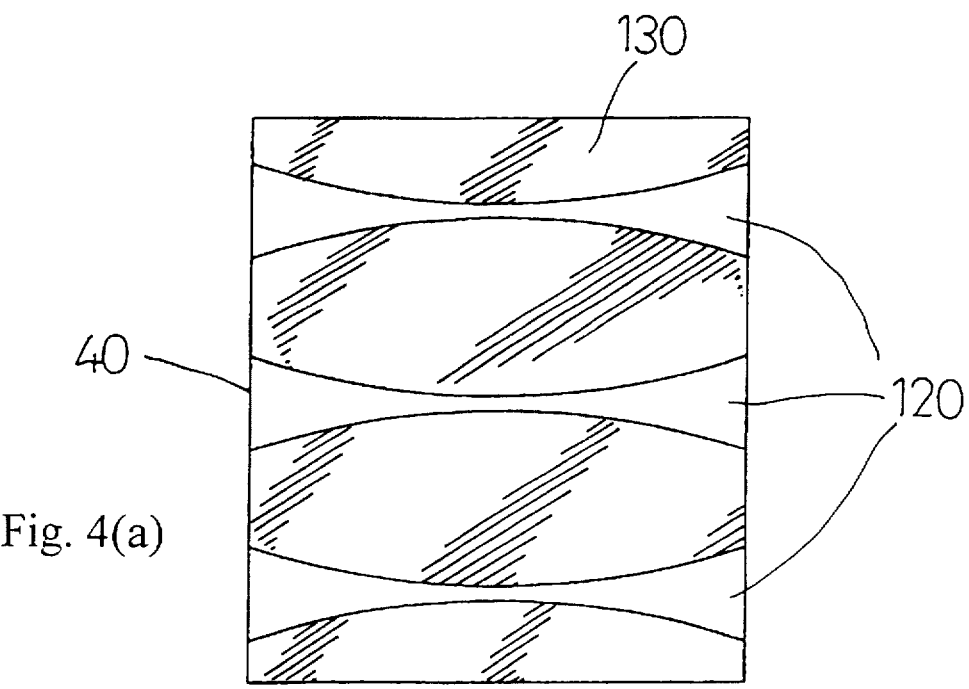
FIGS. 4(a), 4(b) and 4(c) are schematic top, longitudinal sectional and cross-sectional views, respectively, illustrating a substrate having an etching mask used in the method of the present invention.
Figure 4B:
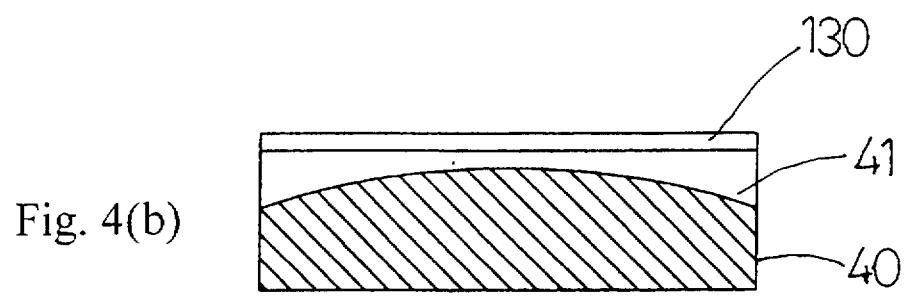
Figure 4C:
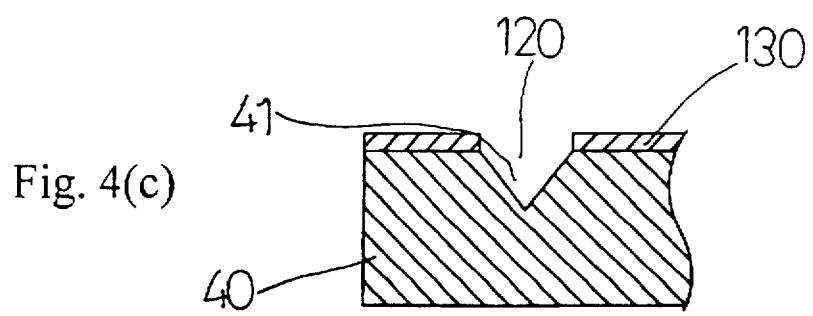

As shown in FIGS. 4(a), 4(b) and 4(c), the first preferred embodiment of the present invention comprises a silicon wafer 40 having an etching mask 130 of silicon dioxide. The etching mask 130 is composed of a plurality of slits 120 which are substantially parallel to one another and are formed by photolithography. Each of the slits 120 has both ends which are wider than the mid-segment of the slit 120. The silicon wafer 40 is chemically etched so as to form a V-shaped recess 41 having a fixed angle, as shown in FIG. 4(c). The formation of the V-shaped recess 41 is possible in view of the fact that the crystal of the silicon wafer 40 has different atomic densities per unit area on different surfaces of the crystal lattice, and that the etching rates along the different directions of the crystal lattice are therefore different. As a result, the recess 41 with a curvature radius ranging between 200 centimeters and 2000 centimeters can be made.

A 633-nm single-mode optical fiber was embedded in each of the recesses 41 of the silicon wafer 40. However, after the fiber was loaded into the recess, optical glue was applied to the fiber along with the silicon wafer. As both ends of the fiber were pulled in opposite directions, the fiber was adhered securely to the surface of the recess 41.

Figure 5:
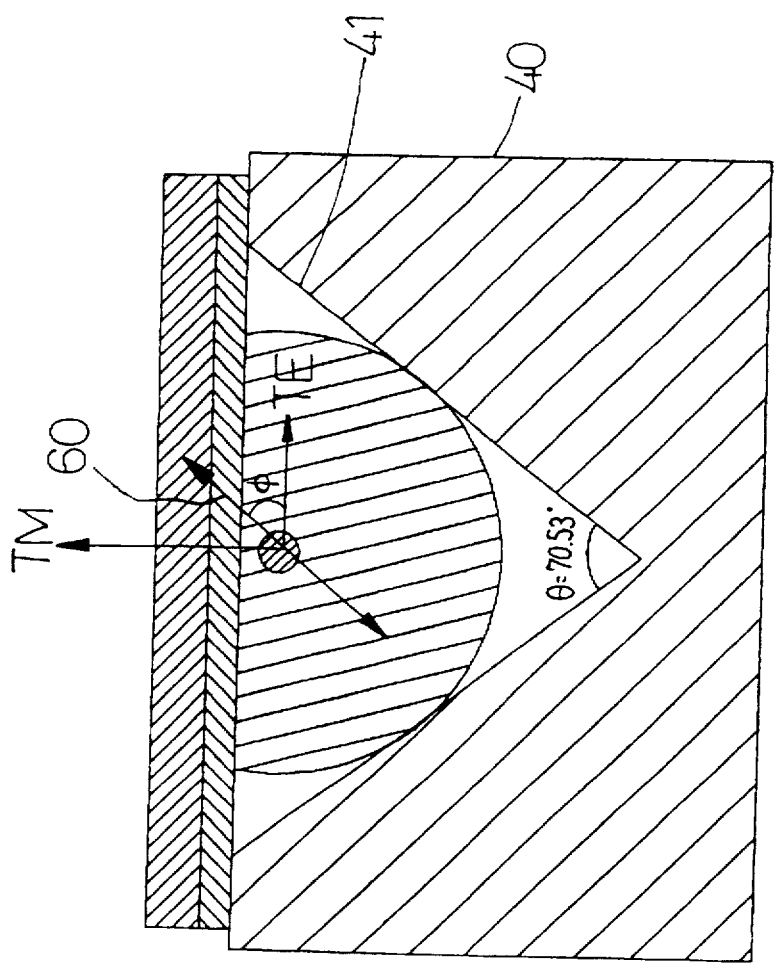
FIG. 5 shows a schematic cross-sectional view illustrating a linearly polarized light in an fiber-optic polarizer made according to a first preferred embodiment of the present invention.
Figure 6:
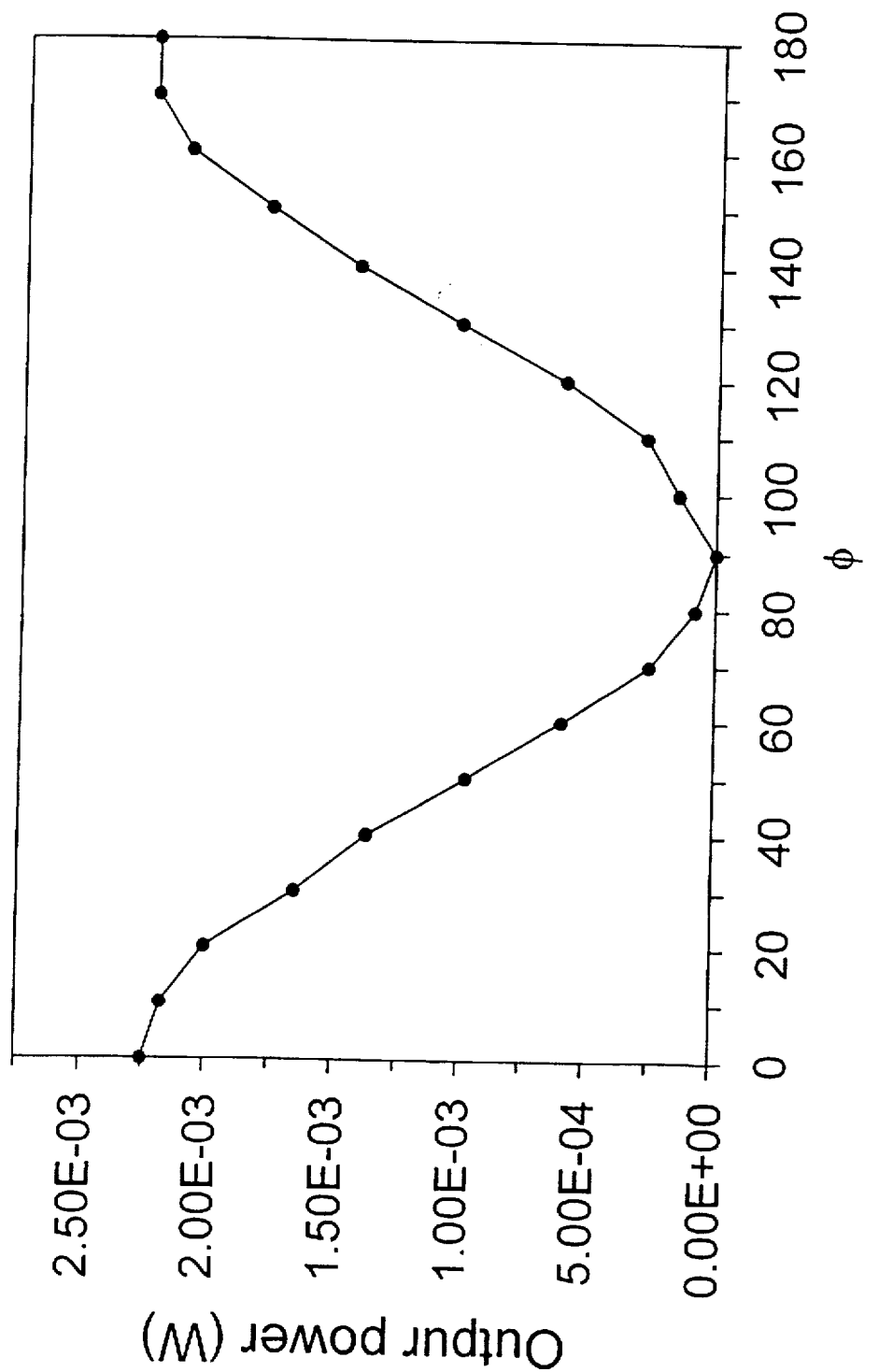
FIG. 6 shows a diagram illustrating the throughput powers of a surface polariton polarizer versus $\phi$ which is the angle between the polarized directions of the incident linearly polarized light and the fiber pseudo-TE mode according to the first preferred embodiment of the present invention. The black dots and solid curve are the measured results and law of Malus, respectively.

A smooth side-polished planar surface was attained by partially polishing the cladding layer of the single-mode optical fiber. The polished planar surface was separated from the core region of the fiber by a distance smaller than one operation wavelength of the fiber for strong reaction. The side-polished planar surface was then deposited by vacuum sputtering with a magnesium fluoride ($MgF_2$) layer 20 having a thickness of 200 nm. The magnesium fluoride layer was subsequently deposited with a thick aluminum layer 50 with a thickness on the order of wavelength or larger as shown in FIG. 5. The fiber-optic polarizer was thus formed. As illustrated in FIG. 5, when the polarization angle $\phi$ of a linearly polarized light (incident light) 60 is 0°, the polarized light is TE polarized light. When the polarization angle $\phi$ of the incident light 60 is 90°, the polarized light is TM polarized light. The output light intensities of the fiber polarizer in relation to various linearly polarized lights are indicated by round black dots in FIG. 6. The solid curve in FIG. 6 is obtained in accordance with the Malus's Law.

Figure 7:
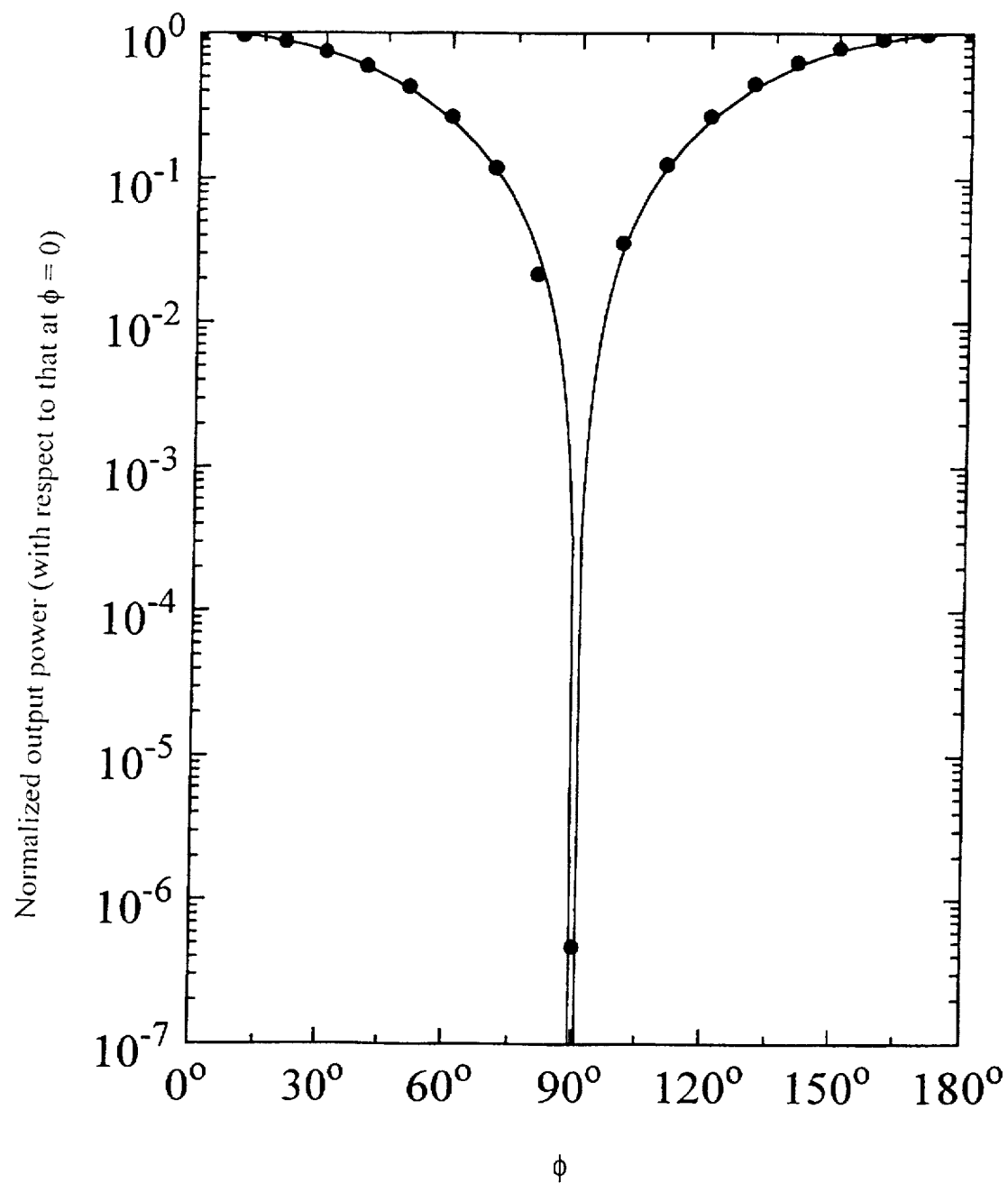
FIG. 7 is a semi-log diagram showing normalized throughput powers of a surface polariton polarizer versus $\phi$ which is the angle between the polarized directions of the incident linearly polarized light and the fiber pseudo-TE mode according to the first preferred embodiment of the present invention. The black dots and solid curve are the measured results and law of Malus, respectively.

The output light intensities of various linearly polarized lights normalized by the output light intensity of TE polarized light and the theoretical values of $\cos^2\phi$ are plotted versus the polarization angle $\phi$ of the incident light in terms of semi-log, as shown in FIG. 7. The extinction ratio of the fiber polarizer of the first preferred embodiment of the present invention is 63 dB. For a superior TM/TE extinction ratio, a $MgF_2$ layer of about 150 nm thick is recommended.

Figure 1:
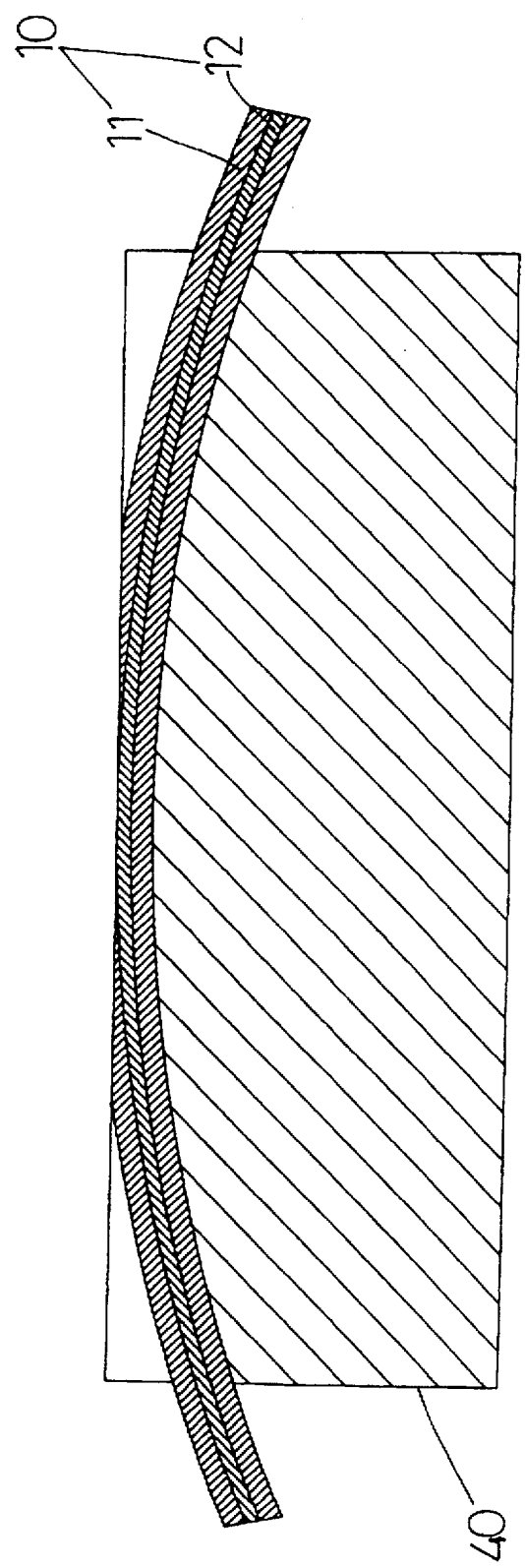
FIG. 1 shows a schematic longitudinal sectional view of a side-polished optical fiber hold in a recess of a polishing substrate.
Figure 3:
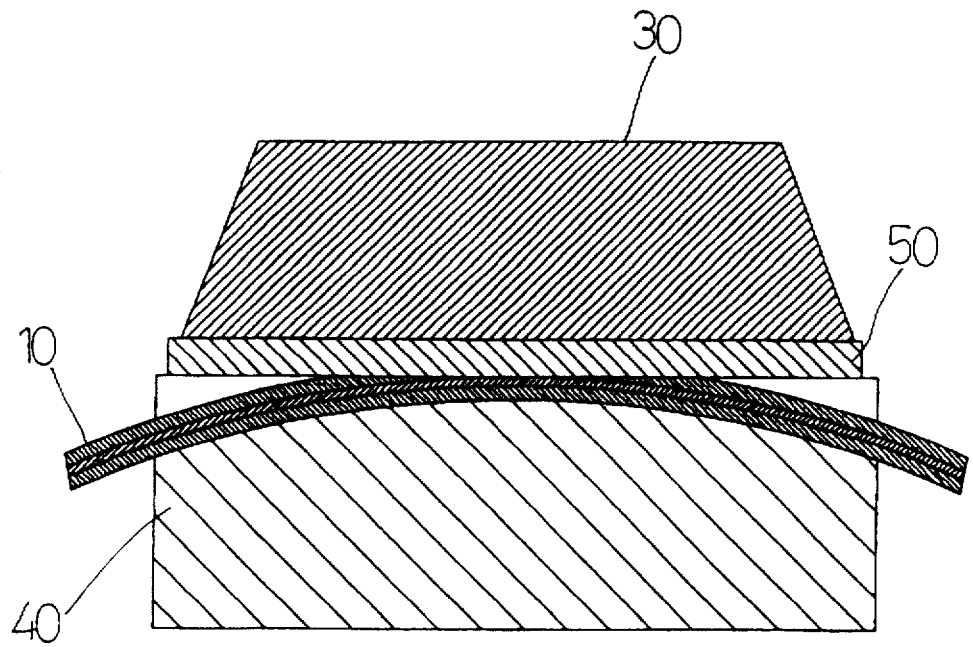
FIG. 3 shows a schematic longitudinal sectional view of another prior art fiber-optic polarizer.
Figure 2:
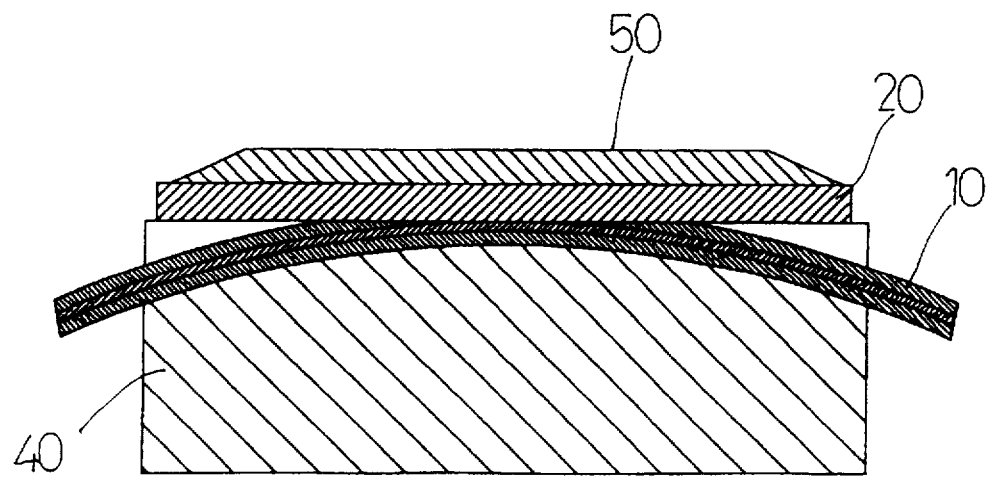
FIG. 2 shows a schematic longitudinal sectional view of a prior art fiber-optic polarizer.
Figure 8:
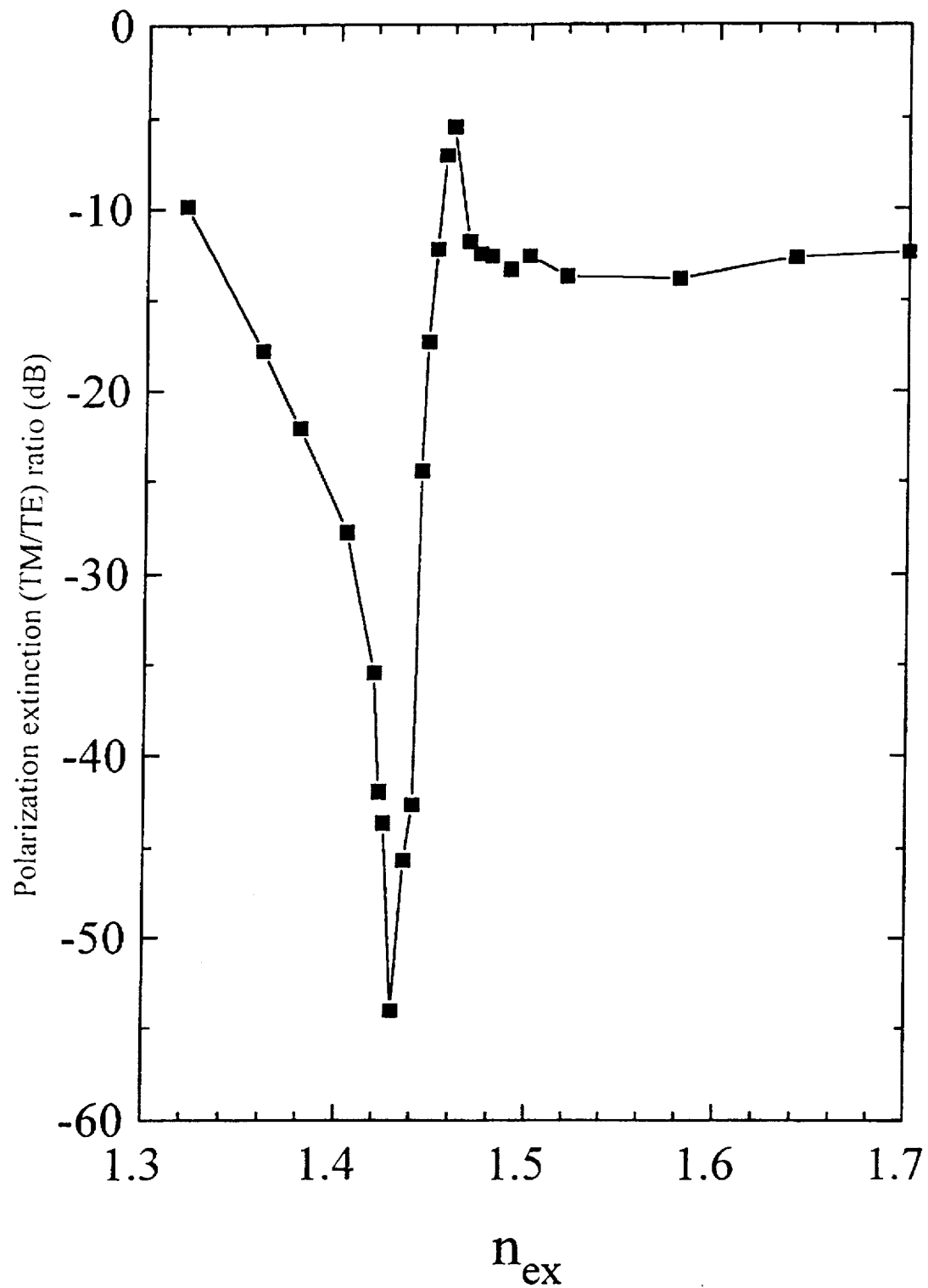
FIG. 8 is a diagram showing the relationship between the refractive index $n_{ex}$ of the dielectric thick film and the polarization extinction ratio (TM/TE) according to a second preferred embodiment of the present invention.

The fiber polarizer of a second preferred embodiment of the present invention was prepared in accordance with the steps described above. However, the side-polished planar surface of the 633-nm single-mode optical fiber of the second preferred embodiment was deposited by vacuum sputtering with an aluminum thin film having a thickness of 28±2 nm. The aluminum thin film was then coated with a dielectric thick film having an appropriate refractive index $n_{ex}$. The fiber polarizer of the second preferred embodiment of the present invention is similar in construction to the fiber polarizer shown in FIG. 3. The extinction ratios of the fiber polarizers of the second preferred embodiment of the present invention are plotted against the refractive indexes $n_{ex}$, as shown in FIG. 8. It is shown in FIG. 8 that the fiber polarizer has an extinction ratio as high as of 54 dB when the refractive index $n_{ex}$ of the dielectric thick film of the fiber polarizer is close to 1.43. For a superior TM/TE extinction ratio, an aluminum layer of about 12 nm thick is recommended.

The method of the present invention has four advantages, which are expounded explicitly hereinafter.

The method of the present invention makes use of the microelectronic techniques by which a plurality of V-shaped recesses are formed such that the recesses have a precise large curvature radius and a precise width and that the recesses are formed simultaneously on one piece of a (100)-oriented silicon wafer.

The method of the present invention allows a plurality of fibers to be secured to the V-shaped recesses of the silicon substrate, thereby allowing the fibers to be polished simultaneously and successfully. The polished fibers have a relatively high sensitivity and a low insertion loss. The insetion loss per unit interaction length of a polished fiber of the present invention can be one order of magnitude smaller than those of polished fibers embedded in a quartz or fuse silica substrate.

The polished fiber of the fiber polarizer prepared by the method of the present invention has a relatively longer effective interaction length and a relatively lower insertion loss. As a result, the polished fiber of the present invention has a relatively wider allowable working wavelength range as compared with the similar structure of the prior art.

The method of the present invention is reliable and can be employed to produce the fiber polarizer in quantity.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A method for preparing a fiber-optic polarizer, said method comprising the steps of:

(a) forming one or a plurality of parallel arcuate recesses on a polishing substrate;

(b) securing by an adhesive one single-mode optical fiber to each one of said recesses of said substrate such that one section of a cladding layer of said single-mode optical fiber is exposed;

(c) polishing the exposed section of said cladding layer to form a polished planar surface contiguous to a core region of said single-mode optical fiber; and (d) forming a buffer dielectric film on said planar surface of said single-mode optical fiber and then forming on said buffer dielectric film a metal layer thicker than its skin depth; or forming on said planar surface a thin metal layer thinner than its skin depth and then optionally forming by vacuum sputtering on said thin metal layer a dielectric thin film capable of protecting said thin metal layer from atmospheric oxidation and finally forming thereon a buffer dielectric material having a refractive index which matches the single-mode optical fiber;

wherein said polishing substrate is a semiconductor substrate have a planar face, and said one or a plurality of arcuate recesses are formed by forming an etching mask having one or a plurality of slits on said planar face, etching the masked planar face of said semiconductor substrate so that one or a plurality of V-shaped recesses parallel to one another and having a curvature radius ranging between 200 centimeters and 2000 centimeters are formed.

2. The method as defined in claim 1, wherein said semiconductor substrate is a silicon wafer.

3. The method as defined in claim 1, wherein said slits of said etching mask are formed by photolithography such that said slits are progressively widened towards both ends thereof from the center thereof.

4. The method as defined in claim 1, wherein said buffer dielectric film is formed of $MgF_2$, $CaF_2$, $BaF_2$, or LiF.

5. The method as defined in claim 1, wherein said buffer dielectric film is formed of a macromolecular material.

6. The method as defined in claim 1, wherein said metal layer is formed of aluminum, nickel, silver, indium, or gold.

* * * * *